United States Patent

Hashiguchi et al.

[11] Patent Number: 5,262,910
[45] Date of Patent: Nov. 16, 1993

[54] CASSETTE LOADING DEVICE FOR ENABLING HORIZONTAL TRANSFER OF THE CASSETTE

[75] Inventors: Yasuhiro Hashiguchi; Noboru Katohno, both of Mito; Kazumasa Inami, Chigasaki, all of Japan

[73] Assignee: Hitachi, Ltd., Tokyo, Japan

[21] Appl. No.: 689,555

[22] Filed: Apr. 23, 1991

[30] Foreign Application Priority Data

Apr. 25, 1990 [JP] Japan .................. 2-107560

[51] Int. Cl.$^5$ .................. G11B 15/675; G11B 15/24
[52] U.S. Cl. .................. 360/96.5; 360/93
[58] Field of Search .............. 360/96.5, 85, 96.6, 360/99.02, 99.06, 93, 83, 71

[56] References Cited

U.S. PATENT DOCUMENTS

| | | | |
|---|---|---|---|
| 4,424,540 | 1/1984 | Naoi | 360/96.5 |
| 4,583,138 | 4/1986 | Imazaike | 360/96.5 |
| 4,680,654 | 7/1987 | Shibuya | 360/96.5 |
| 5,062,015 | 10/1991 | Maeng | 360/96.5 |

FOREIGN PATENT DOCUMENTS

| | | | |
|---|---|---|---|
| 3518786 | 11/1986 | Fed. Rep. of Germany | 360/96.5 |
| 0127953 | 8/1982 | Japan | 360/96.5 |
| 0031363 | 2/1990 | Japan | |

*Primary Examiner*—Stuart S. Levy
*Assistant Examiner*—Craig A. Renner
*Attorney, Agent, or Firm*—Antonelli, Terry, Stout & Kraus

[57] ABSTRACT

A cassette loading device, wherein, when a rack, formed on a tray supporting a holder for holding a cassette, comes out of mesh with a pinion gear serving as a drive source, the tray itself is engaged with the pinion gear, so that the pinion gear urges the tray, thereby transferring the tray to a position of completion of its horizontal transfer thereby enabling the cassette to be transferred in a stable manner.

1 Claim, 11 Drawing Sheets

CASSETTE LOADING DEVICE FOR ENABLING HORIZONTAL TRANSFER OF THE CASSETTE

BACKGROUND OF THE INVENTION

This invention relates to a cassette loading device for transferring a cassette, containing a magnetic tape, to a cassette loading position where information can be recorded on and reproduced from the magnetic tape.

A conventional, most commonly-used cassette loading device of the aforementioned type is front loading type, wherein a cassette is inserted into an opening, formed in a front panel of a magnetic recording and reproducing device, and is pushed to urge a holder. When the holder is pushed by a predetermined distance, a motor switch is closed to cause a motor to rotate. The driving force of the motor moves the holder horizontally in the same direction as the direction of the cassette insertion, and then moves the holder vertically downwardly, thereby bringing the cassette to a cassette loading position.

In such a front loading-type device, however, the cassette must be inserted horizontally into the narrow opening formed in the front panel, and this is rather inconvenient.

A linear skating type cassette loading device has been proposed in, for example, Japanese Patent Unexamined Publication 2-31363 in which a cassette needs only to be placed on a tray from above the tray. In such a loading device, the tray for supporting the cassette thereon can be projected to a stand-by position disposed forwardly of a front panel of a recording and reproducing device, and the cassette can be placed on the thus projected tray from above the tray. When either pushing the tray or pressing an on-off button, the tray is horizontally transferred by the driving force of a motor, and then the cassette is vertically moved to a cassette loading position.

In a linear skating-type cassette loading device, the cassette is not placed directly on the tray, but is placed on a holder supported on the tray. The drive mechanism is of such a design that the tray is transferred only in the horizontal direction, and after the horizontal transfer of the tray, only the holder is moved vertically.

In this drive mechanism, a rack, formed integrally with the tray, is in mesh with a pinion gear to which the rotational force of the motor is transmitted, so that the cassette is horizontally transferred into a magnetic recording and reproducing device. After the cassette is horizontally moved by a predetermined stroke, the horizontal movement of the cassette is changed into a vertical movement. This vertical transfer of the cassette is driven by an arm swingable in dependence upon a cam groove in the pinion gear.

During the rotation of the motor, the pinion gear is continuously rotated. In order to change the direction of movement of the cassette, it is necessary to release the meshing between the rack and the pinion gear before the horizontal transfer of the cassette is completed. It is desired that immediately after this meshing is released, the cassette begins to move vertically. However, it is impossible to start this vertical movement before the next tooth of the pinion gear is brought into engagement with the tooth of the rack. Therefore, the position of release of the meshing is disposed by a predetermined distance before the point of start of the above vertical movement. Thus, the driving is interrupted during the transfer of the cassette, and this makes the transfer of the cassette unstable.

SUMMARY OF THE INVENTION

It is an object of the invention to provide a cassette loading device which is simple in construction, and does not interrupt the driving during the transfer of a cassette, thereby achieving a stable transfer of the cassette.

To achieve the above object, there is provided a cassette loading device in which, when a rack formed on a horizontally-movable tray supporting a holder for holding a cassette, comes out of mesh with a pinion gear, the tray itself is engaged with the pinion gear, so that the pinion gear urges the tray, thereby transferring the tray to a position of completion of its horizontal transfer.

The pinion gear is to be engaged directly with the tray itself at a position several millimeters before the position of completion of the horizontal transfer of the tray. At the same time, the meshing between the rack and the pinion gear is released, and thereafter the tray is urged by the pinion gear to be transferred to the position of completion of its horizontal transfer.

DESCRIPTION OF THE PREFERRED EMBODIMENT

Figure 3:
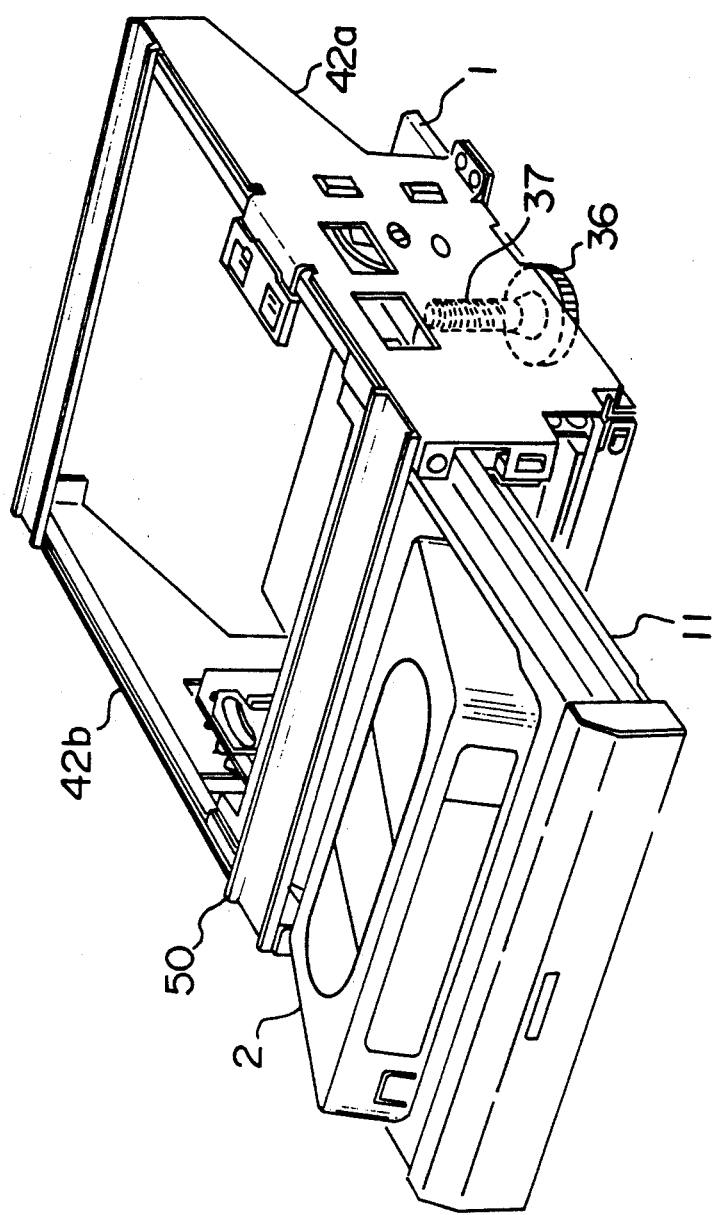
FIG. 3 is a perspective view showing a cassette-insertion.

Referring to FIG. 3, a tray 11 is horizontally movable or transferable from a position (cassette standby position shown in FIGS. 3 and 5) on the left side of a front panel 60 (FIG. 5) to a position on the right or inward side of the front panel 60 through a gate-shaped structure (FIG. 3) formed by outer frames 42a and 42b and a top plate 50. As shown in FIG. 5, a holder 12 is mounted in the tray 11, and a cassette 2 is adapted to be placed on and held by the holder 12. After the tray 11 is transferred horizontally, the holder 12 is moved vertically into a cassette loading position, thus completing the transfer operation. The driving force for this transfer operation is transmitted from a capstan motor 8 (FIG. 4) mounted on a chassis 1 shown in FIG. 1.

Figure 4:
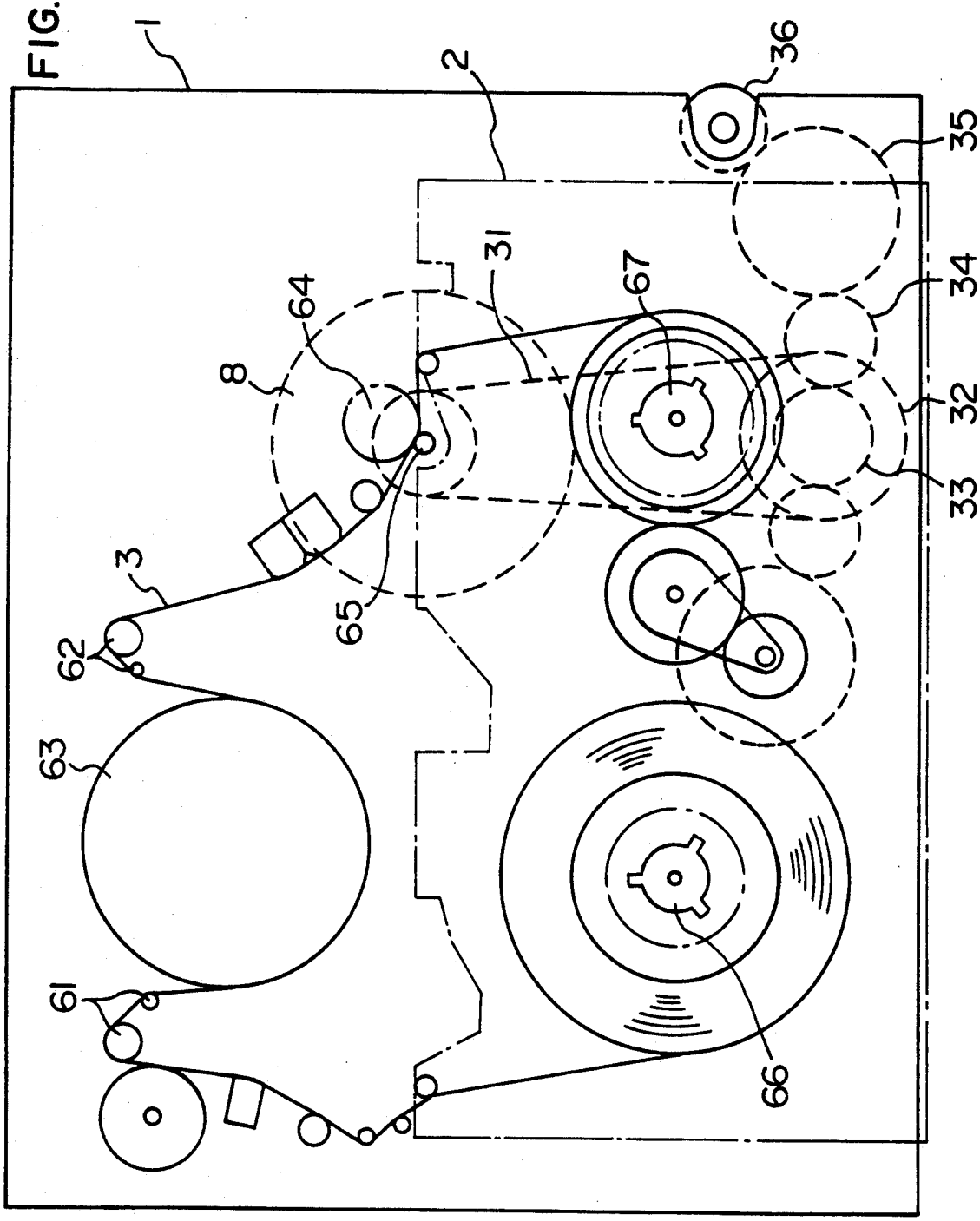
FIG. 4 is a schematic plan view of a VTR chassis.
Figure 5:
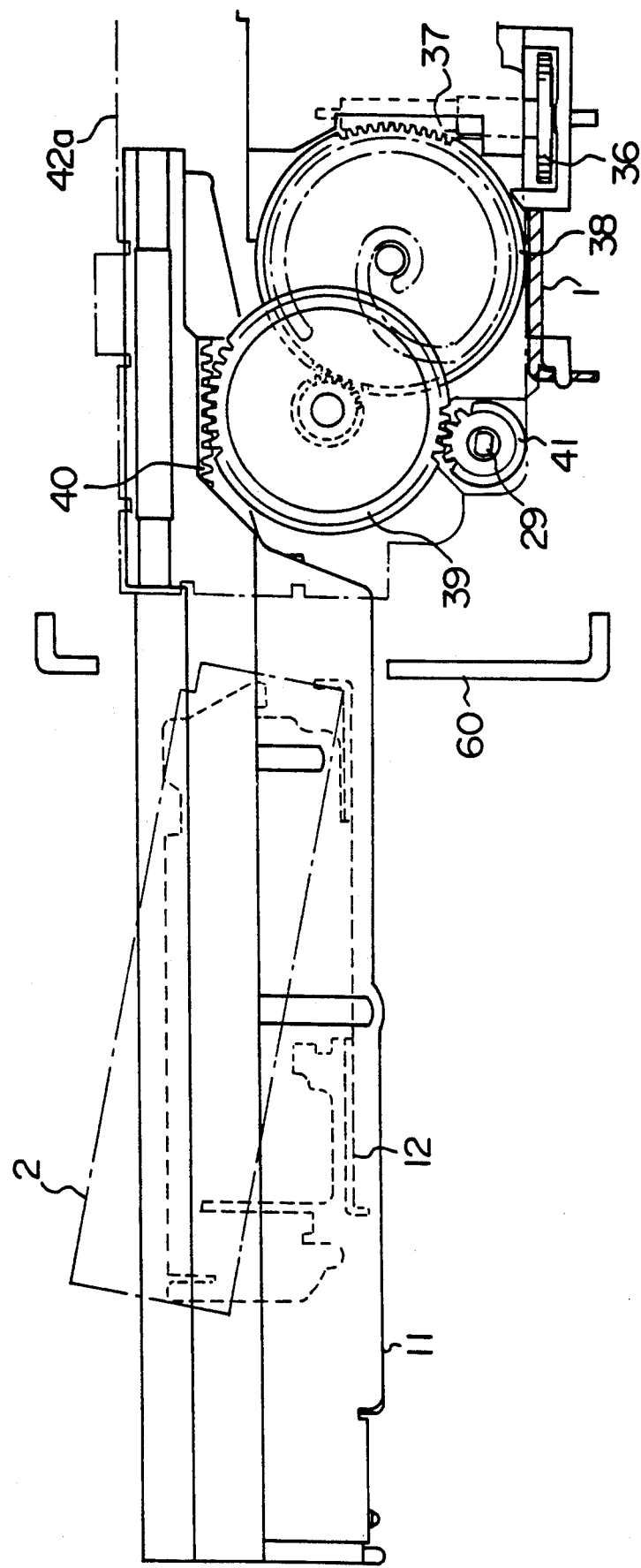
FIG. 5 is a fragmental side-elevational view in a cassette stand-by condition.

In FIG. 4, when a switch (not shown) is closed by either slightly pushing the tray 11 by the hand or pressing an on-off button (not shown), the capstan motor 8 is operated to transmit its driving force to a pulley 32 through a belt 31. This driving force is transmitted to a gear 36 via the gear 33 coaxial with the pulley 32, and gears 34 and 35.

Figure 1:
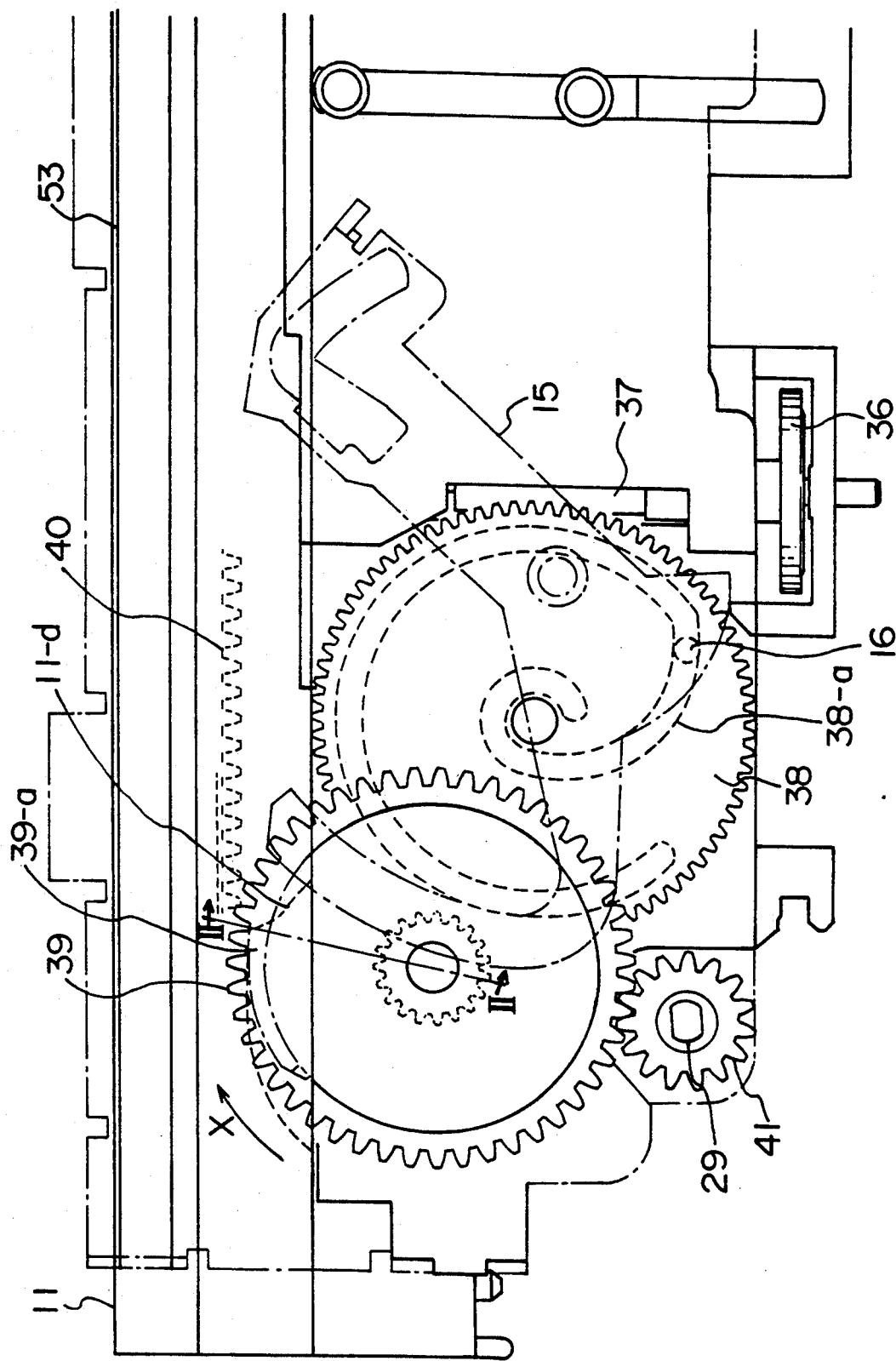
FIG. 1 is a fragmental side-elevational view of an embodiment of the present invention.

As shown in FIGS. 1, 3 and 5, a worm 37 is fixedly mounted on the gear 36, and is in mesh with a worm wheel (FIG. 5) which is disposed inwardly of the outer frame 42a shown in FIG. 3. The worm wheel 38 is in mesh with a pinion gear 39. A rack 40 formed integrally with the tray 11 is in mesh with the pinion gear 39, and the tray 11 is transferred in the horizontal direction by the rotation of the motor 8 shown in FIG. 4. A synchronizing gear 41, in mesh with the pinion gear 39, transmits the driving force toward the outer frame 42b (FIG. 3) via a synchronizing shaft 29. The same construction as provided at the inner side of the outer frame 42a as shown in FIGS. 1 and 3 is also provided at the inner side of the opposite outer frame 42b in a right and a left symmetrical relationship and, with this arrangement, the tray 11 and the holder 12 can be stably transferred.

Figure 2:
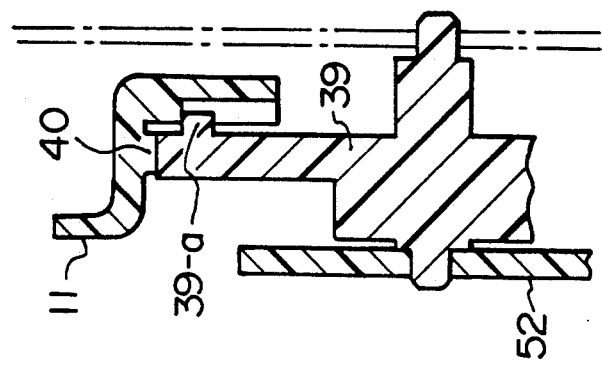
FIG. 2 is a cross-sectional view taken along the line II—II of FIG. 1.
Figure 7:
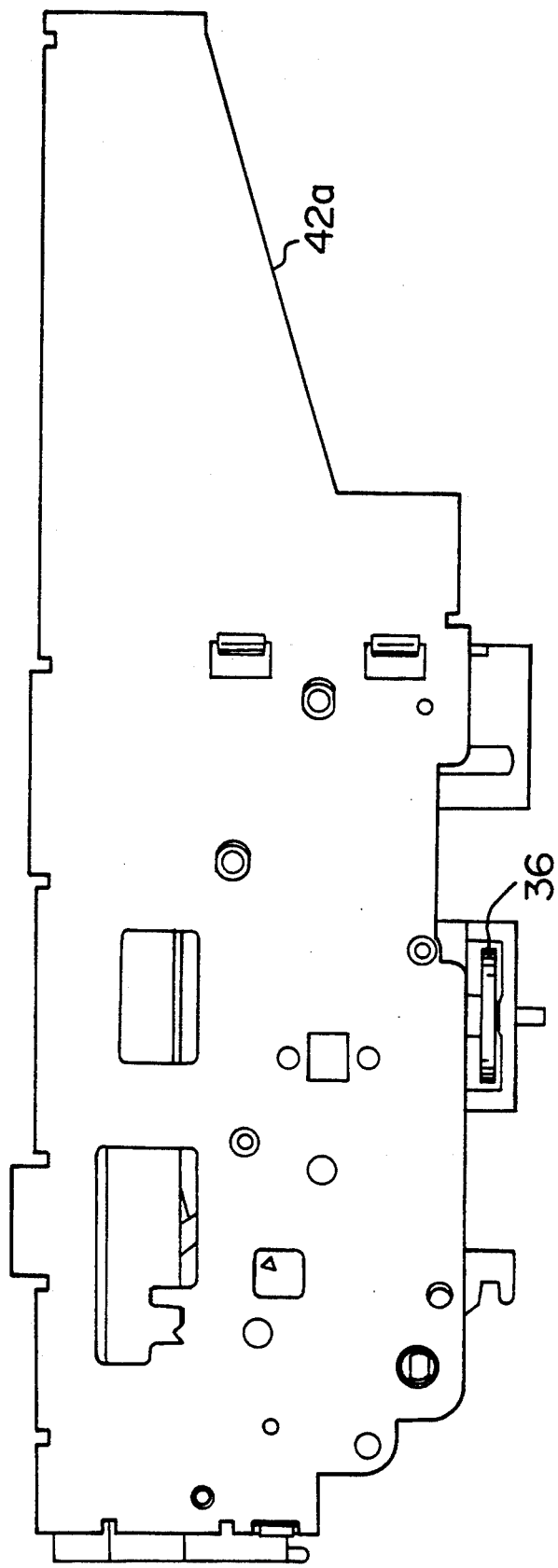
FIG. 7 is a side-elevational view taken along the line VII—VII in FIG. 6.

FIG. 1 is a side-elevational view with the outer frame 42a removed from FIG. 3, showing the condition in which the meshing between the pinion gear 39 and the rack 40 is just to be released immediately before the horizontal transfer of the cassette 2 is completed. The meshing between the pinion gear 39 and the rack 40 is released at a position several millimeters before the position of completion of the horizontal transfer i.e, the position of start of the vertical movement. With this arrangement, when the rack 40 is stopped, the next tooth of the pinion gear 39, continuing to rotate, will not be brought into engagement with the stopped rack 40, thus preventing the generation of an undesirable sound due to this engagement. In order to transfer the tray 11 by the above distance of several millimeters, a projection 39-a formed, integrally on the pinion gear 39, is engaged with a cam portion 11-d formed on the tray 11, as shown in FIGS. 1 and 2. Therefore, the tray 11 is first transferred horizontally by the meshing of the rack 40 with the pinion gear 39, and then is brought into engagement with the projection 39-a after the meshing between the rack 40 and the pinion gear 39 is released. At this time, since the pinion gear 39 further continues to rotate in a direction of arrow X (FIG. 1), the pinion gear 39 pushes or urges the tray 11, and then the horizontal transfer is completed. The horizontal movement of the tray 11 is supported by shafts 53 (FIG. 7B) mounted on the outer frames 42a and 42b.

Figure 6:
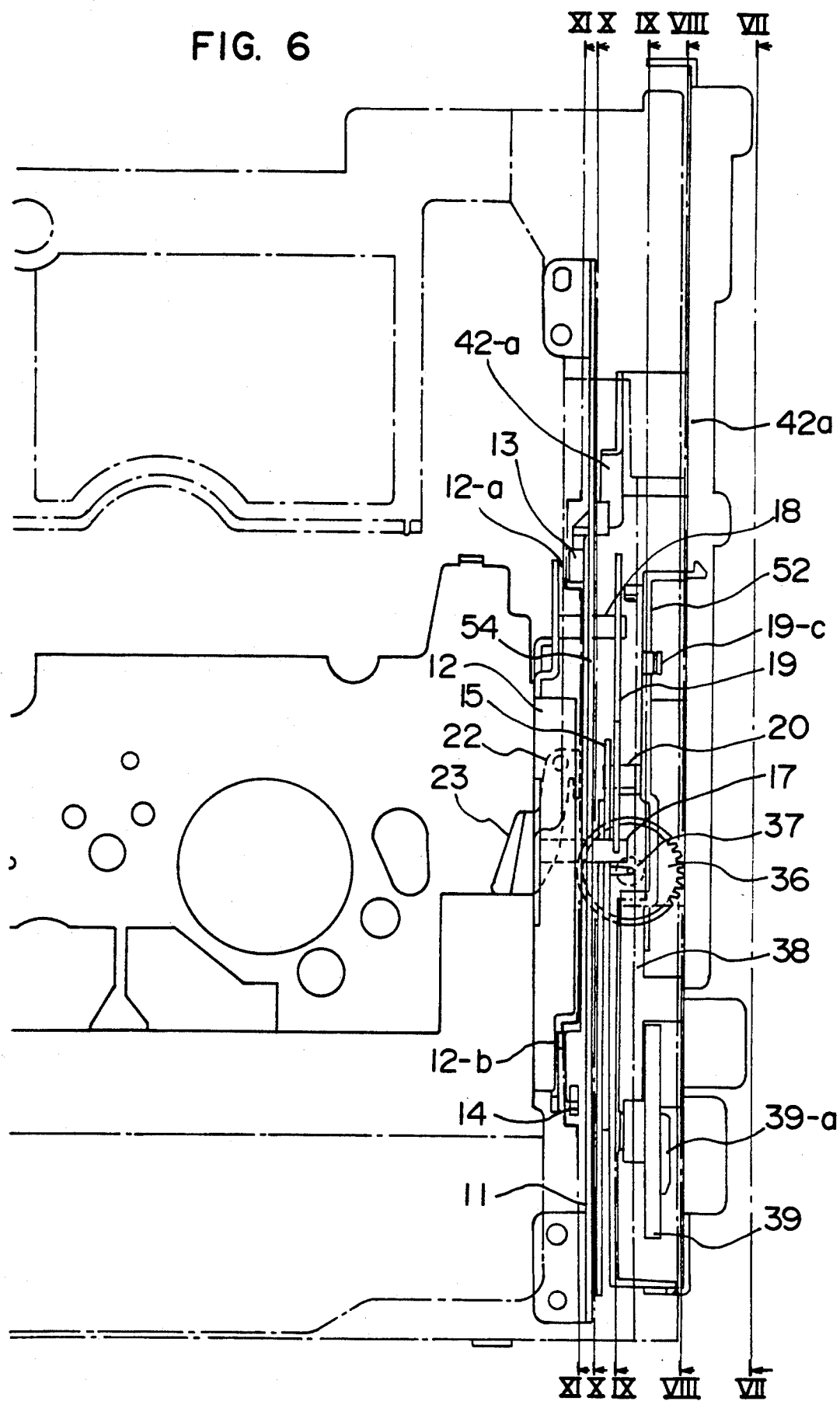
FIG. 6 is an enlarged plan view of FIG. 1, showing the condition in which a tray is horizontally transferred inwardly of a front panel to a position immediately before the position of completion of the horizontal transfer of the tray.

As shown in FIG. 6, the worm 37, the worm wheel 38 and the pinion gear 39 shown in FIGS. 1 and 5 are rotatably supported by the outer frame 42a and a bracket 52. As shown in FIG. 2, the pinion gear 39 is rotatably supported by the outer frame 42a and the bracket 52 and the pinion gear 39 meshes with the rack 40 of the tray 11, with the tray 11 engaging with the projection 39-a of the pinion gear 39.

The foregoing is explanation of the horizontal transfer of the cassette 2. Next, the vertical transfer of the cassette 2 will be described below.

Figure 9:
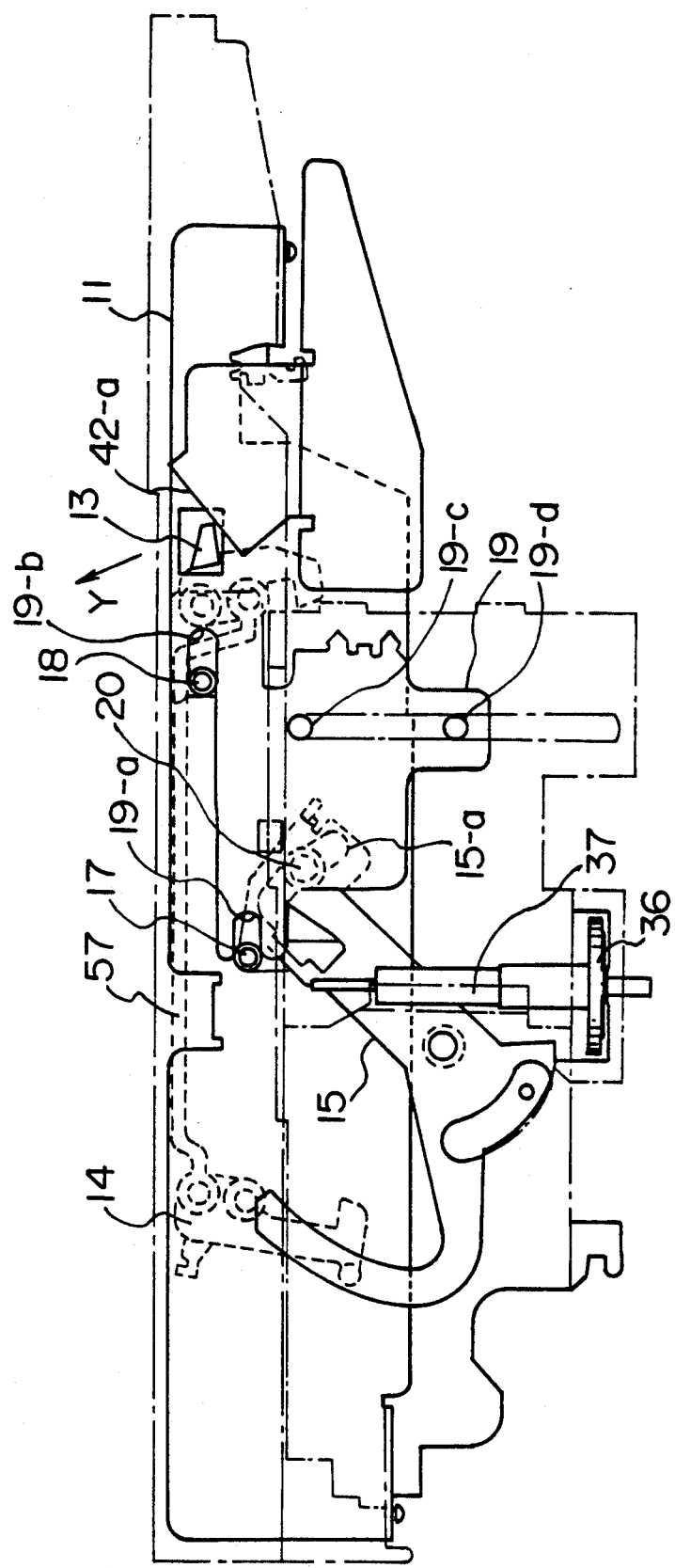
FIG. 9 is a side-elevational view taken along the line IX—IX in FIG. 6.
Figure 10:
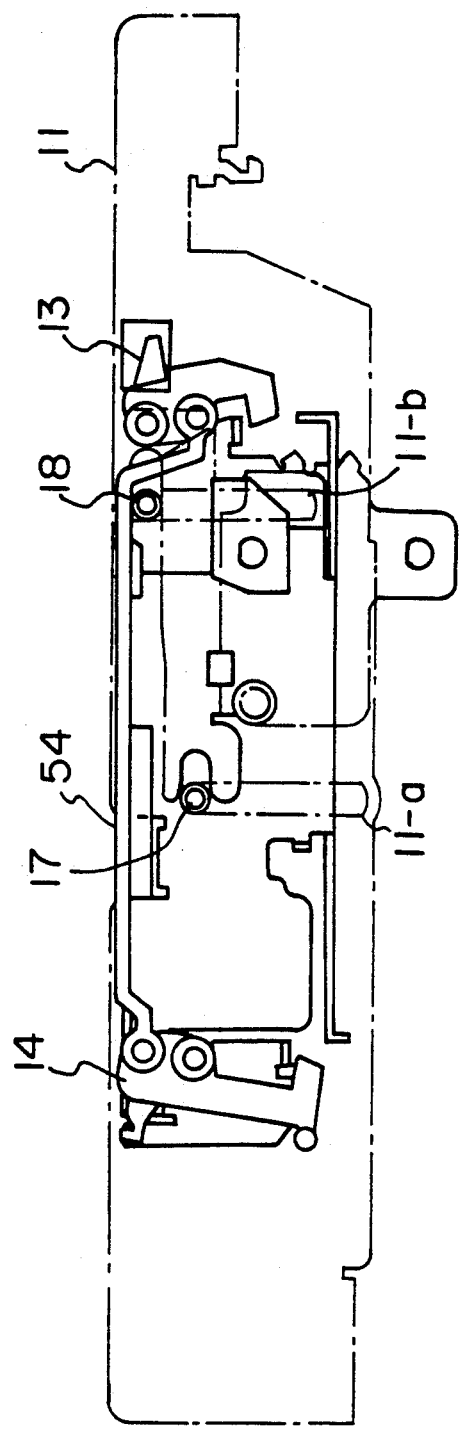
FIG. 10 is a side-elevational view taken along the line X—X in FIG. 6.
Figure 11:
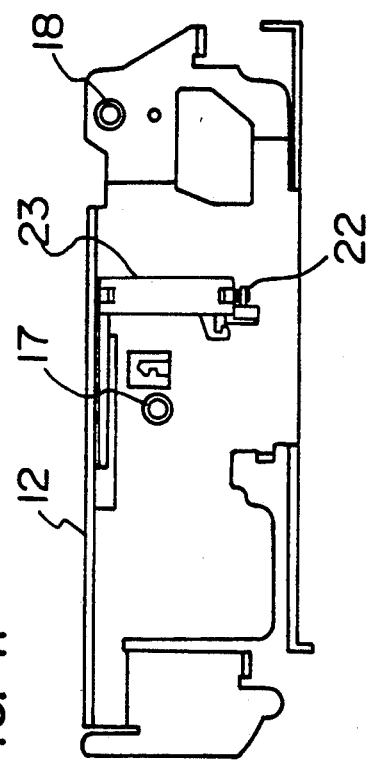
FIG. 11 is a side-elevational view taken along the line XI—XI in FIG. 6.

As described above, the holder 12 is placed on the tray 11 in FIG. 5. The cassette 2 is placed on the holder 12 in the cassette stand-by position shown in FIG. 5, so that the holder 12 holds the cassette 2. The holder 12 is formed by a iron plate. As shown in FIG. 6, bent portions 12-a and 12-b of the holder 12 are placed respectively on retaining arms 13 and 14 pivotally mounted on the tray 11. The retaining arm 13 and 14 are interconnected by a connecting arm 54. The holder 12 holding the cassette 2 is transferred over a most part of the above horizontal transfer, that is, to the position immediately before the completion of the horizontal transfer. At this time, the retaining arm 13 abuts against a stamped projection 42-a formed on the outer frame 42a, as shown in FIG. 9. The tray 11 further continues to be transferred horizontally, and therefore in response to this horizontal transfer, the retaining arm 13 is swung in a direction of an arrow Y (FIG. 9), so that the retaining arm 13 is disengaged from the holder 12. The retaining arm 14 is also swung via the connecting arm 54 in synchronism with the swing movement of the retaining arm 13, so that the retaining arm 14 is similarly disengaged from the holder 12. Before this disengagement occurs, columns 17 and 18 fitted on the holder 12 are received respectively in slits 19-a and 19-b formed in an elevator guide 19.

A column 20 fitted on the elevator guide 19 extends through a slit 15-a formed in an arm 15, and the arm 15 supports the elevator guide 19.

Therefore, when the holder 12 is disengaged from the retaining arm 13 as described above, the holder 12 is supported by the elevator guide 19. Namely, the holder 12 holding the cassette 2 is supported by the arm 15.

Figure 8:
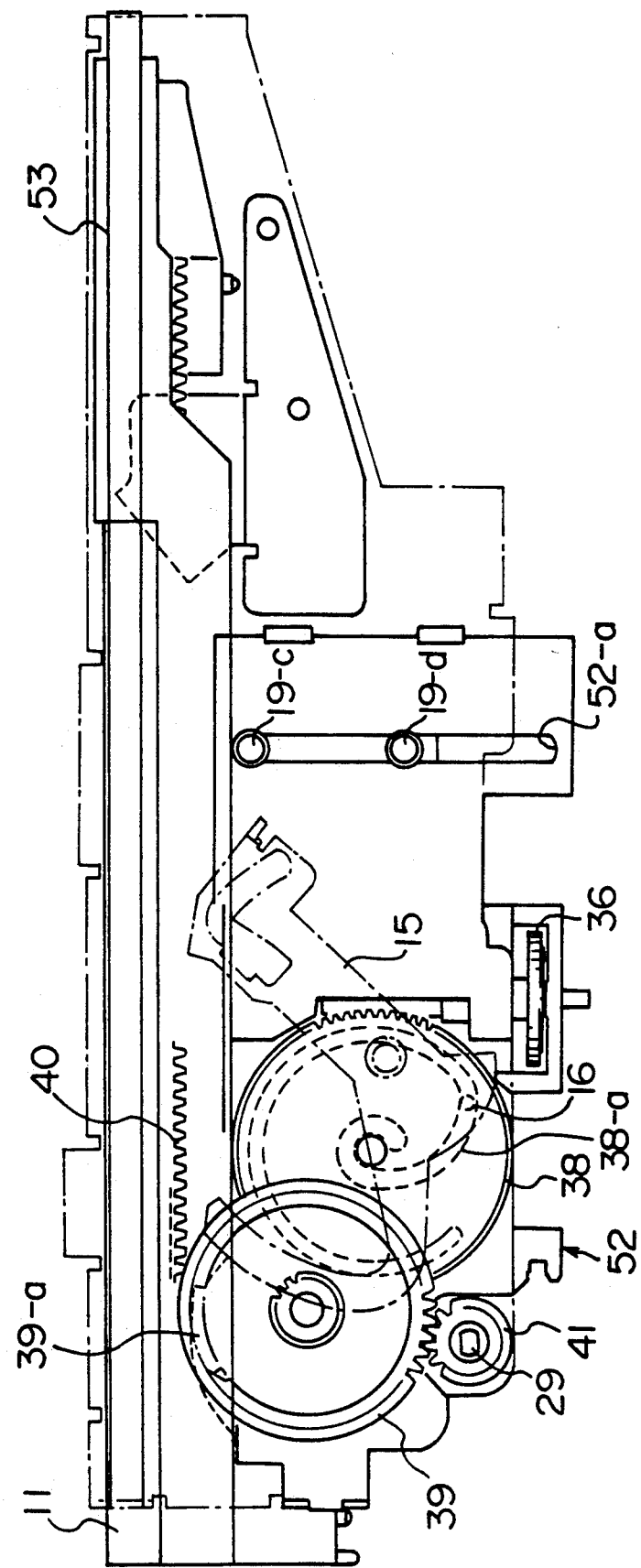
FIG. 8 is a side-elevational view taken along the line VIII—VIII in FIG. 6.

As shown in FIG. 8, a column 16, fitted on the arm 15, is engaged with a cam 38-a formed on the worm wheel 38. When the horizontal transfer of the tray 11 is completed, the arm 15 is swung in accordance with the configuration of the cam 38-a, so that the holder 12 holding the cassette 2, is moved vertically downwardly. Columns 19-c and 19-d are fitted on the elevator guide 19, and are received in a groove 52-a formed in the bracket 52 so as to maintain the posture of the elevator guide 19 during the downward movement thereof. The shafts 17 and 18 on the holder 12 are extended respectively through slits 11-a and 11-b, formed in the tray 11, so as to limit the posture of the holder 12 during the downward movement thereof.

Figure 12:
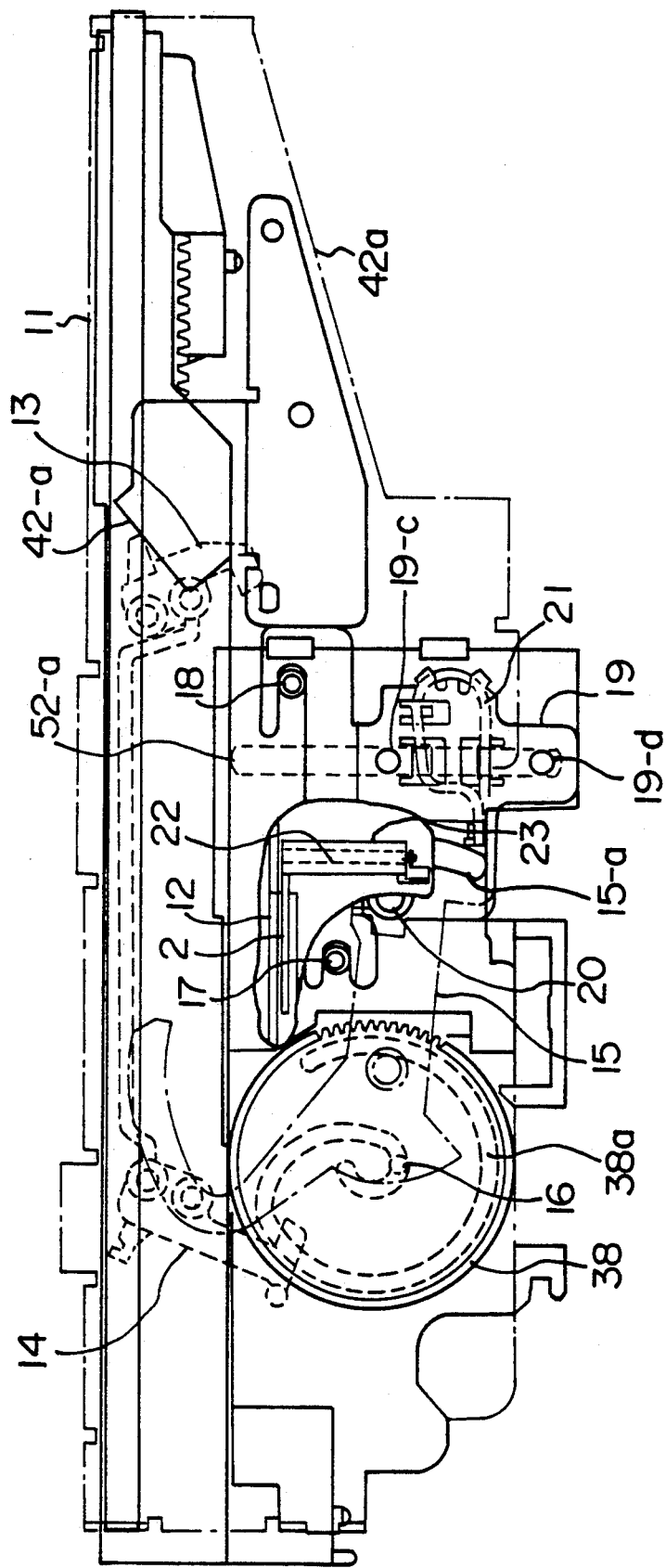
FIG. 12 is a side-elevational view showing a cassette pressed condition after the loading of the cassette.

The arm 15 is further swung to press the cassette 2 against a cassette mounting surface of the chassis 1. As shown in FIG. 12, the arm 15, after placing the cassette 2 on the cassette mounting surface (not shown) formed on the chassis 1, further continues to swing to urge a pressing spring 21 suspended from the elevator guide 19. The reaction force of the pressing spring 21 is transmitted to the holder 12 via the elevator guide 19. A column 22 is fitted on the holder 12, and a pressing arm 23 is pivotally mounted on the column 22. In response to the reaction force of the pressing spring 21, the pressing arm 23 presses the cassette 2 from the upper surface thereof.

After this pressing operation, as shown in FIG. 4, a magnetic tape 3 is taken out of the cassette 2 by loading members 61 and 62, and is wound on the periphery of a rotary head cylinder 63 by a predetermined angle, and a pinch roller 64 is held against a capstan 65 through the magnetic tape therebetween, and reels 66 and 67 are rotated, thereby carrying out the magnetic recording-/reproducing. At this time, the pressing arm 23 (FIG. 12) always applies the urging force to the cassette 2, and therefore the cassette 2 will not float and can be stably maintained in proper position.

The foregoing is explanation of the insertion operation of the cassette 2. Next, the discharge operation of the cassette 2 will be described below.

In FIG. 4, when the motor 8 is reversed, the worm wheel 38 is inverted to make the arm 15 (FIG. 12) swing in a direction opposite to the direction for the cassette insertion operation. As a result, the elevator guide 19 is lifted via the column 20 fitted on the arm 15, and begins to move upward. Therefore, with this movement, the condition shown in FIG. 12 is shifted to the condition shown in FIG. 13.

Figure 13:
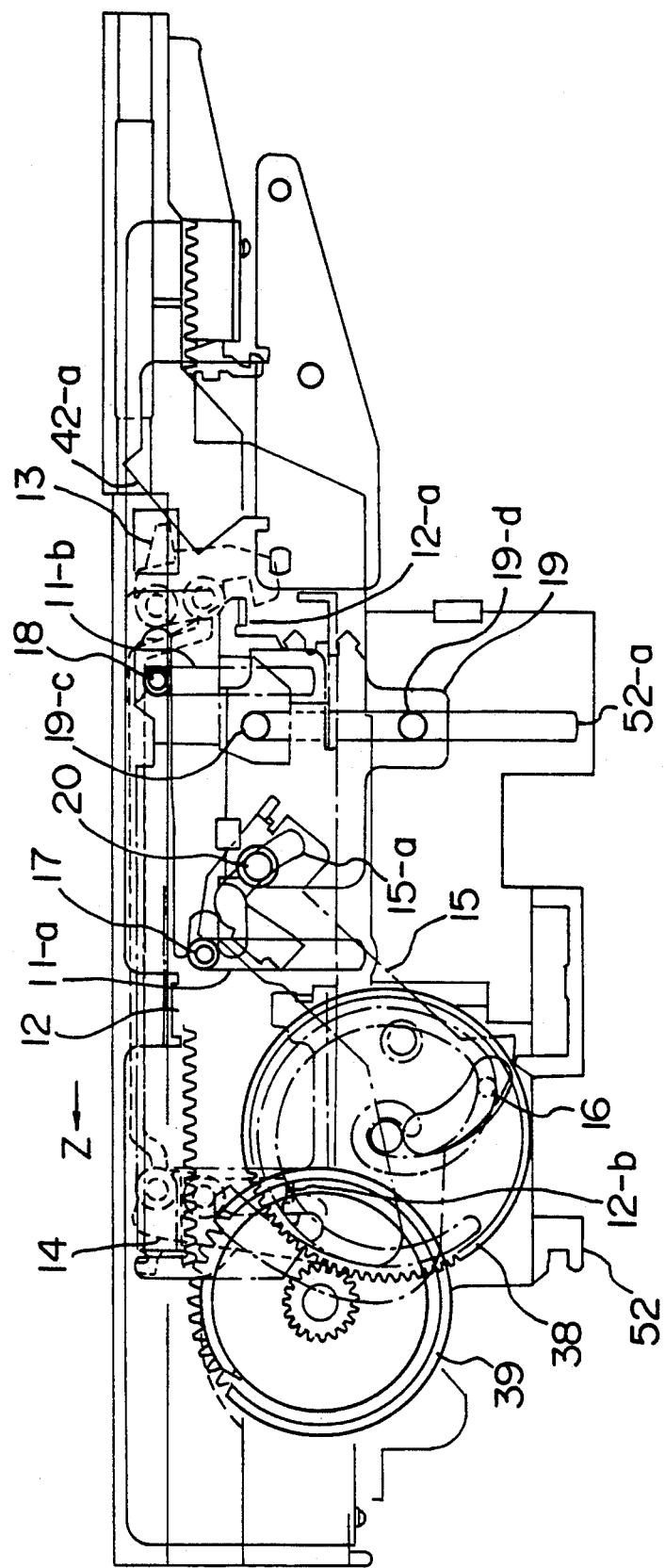
FIG. 13 is a side-elevational view showing the condition in which a vertical movement for discharging the cassette is completed.

Thus, although the arm 15 lifts the column 20 of the elevator guide 19, the elevator guide 19 is maintained at a predetermined height due to the configuration of the slit 15-a. FIG. 13 shows such a condition in which the elevator guide 19 is kept at the predetermined height. Thereafter, the shaft 20 is shifted along the arcuate shape of the slit 15-a.

The arm 15 is further swung, and abuts against the column 17 of the holder 12 to urge the holder 12 in a direction of an arrow Z. The retaining arms 13 and 14 are disengaged from the holder 12 as described above, but since the holder 12 begins to move in the horizontal direction, the tray 11 is also engaged, and the retaining arms 13 and 14 are again engaged with the holder 12. Further, the shafts 17 and 18 received respectively in the slits 19-a and 19-b of the elevator guide 19 are disengaged therefrom.

During the above operation, the pinion gear 39 continues to rotate, and the rack 40 of the tray 11, driven by the arm 15, meshes with the pinion gear 39 from the starting point of the rack 40. This meshing starts at the same position as that of the release of the meshing at the time of the cassette insertion operation, and this position is shown in FIG. 1.

When the rack 40, meshes with the pinion gear 39, the tray 11 is driven by the pinion gear 39, and is transferred horizontally until the motor 8 is stopped by a switch (not shown).

The foregoing is explanation of the cassette discharge operation. The projection 39-a of the pinion gear 39 which completes the horizontal transfer of the tray 11 is not related to the cassette discharge operation at all, however, the projection 39-a serves as a stopper which prevents withdrawal of the tray 11 when manually pulling the tray 11 during the discharge operation immediately after the horizontal movement begins.

As described above, in the present invention, when the rack formed on the tray comes out of mesh with the pinion gear, driven by the motor, before the horizontal transfer of the cassette is completed, the tray itself is engaged with the pinion gear so as to be further transferred horizontally by the rotation of the pinion gear, and therefore the transfer of the cassette can be carried out in a stable manner.

What is claimed is:

1. A cassette loading device comprising:
   a holder for holding a cassette containing a magnetic tape;
   a tray for supporting said holder, said tray being transferable in a horizontal direction from a cassette standby position disposed forwardly of a front panel of a magnetic recording and reproducing device to a position disposed inwardly of said front panel, said cassette being adapted to be placed on said holder when said tray is at said cassette standby position;
   a rack formed on said tray and extending in a transfer direction of said tray;
   a rotatable pinion gear adapted to mesh with said rack so as to horizontally move said rack when said pinion gear receives a driving force of a motor;
   means for engaging said tray with said pinion gear upon release of a meshing between said rack and said pinion gear at a position immediately before a completion position of a horizontal transfer of said tray, so as to transfer said tray to said completion position of said horizontal transfer of said tray through rotation of said pinion gear;
   means for disengaging said holder from said tray when said tray reaches said completion position of said horizontal transfer of said tray; and
   arm means engaged with said pinion gear for transferring said holder vertically from said completion position of said horizontal transfer of said tray in response to the rotation of said pinion gear, thereby bringing said cassette to a cassette loading position, wherein said means for engaging comprises a cam portion provided on said tray and a projection provided on said pinion gear, said projection urging said cam portion in response to the rotation of said pinion gear so as to transfer said tray to the completion position of said horizontal transfer of said tray.

* * * * *